United States Patent
Gottwald et al.

(10) Patent No.: US 9,529,215 B2
(45) Date of Patent: Dec. 27, 2016

(54) OPTICAL NETWORK ELEMENT

(75) Inventors: Erich Gottwald, Holzkirchen (DE); Harald Rohde, Munich (DE)

(73) Assignee: Xieon Networks S.a.r.l., Luxembourg (LU)

( * ) Notice: Subject to any disclaimer, the term of this patent is extended or adjusted under 35 U.S.C. 154(b) by 0 days.

(21) Appl. No.: 13/579,341

(22) PCT Filed: Feb. 10, 2011

(86) PCT No.: PCT/EP2011/051956
§ 371 (c)(1),
(2), (4) Date: Sep. 17, 2012

(87) PCT Pub. No.: WO2011/101283
PCT Pub. Date: Aug. 25, 2011

(65) Prior Publication Data
US 2013/0208335 A1    Aug. 15, 2013

(30) Foreign Application Priority Data

Feb. 16, 2010   (EP) .................................. 10153711

(51) Int. Cl.
*G02F 1/01*   (2006.01)
*H04B 10/61*   (2013.01)
*H04J 14/02*   (2006.01)

(52) U.S. Cl.
CPC ............ *G02F 1/01* (2013.01); *H04B 10/6164* (2013.01); *H04B 10/6165* (2013.01); *H04J 14/02* (2013.01)

(58) Field of Classification Search
CPC  H04N 21/4622; H04N 17/04; H04N 21/2665; H04N 21/438; H04N 21/6175; H04N 21/6193; G06Q 20/32; G06Q 30/0267; G06F 11/2002; G06F 17/30283
(Continued)

(56) References Cited

U.S. PATENT DOCUMENTS 5,657,144 A    8/1997  Tanaka et al.
5,715,075 A *  2/1998  Tanaka et al. .................. 398/48
(Continued)

FOREIGN PATENT DOCUMENTS

EP    0 494 831 A2    7/1992

OTHER PUBLICATIONS

Izutsu M et al., "Linear Single-Sideband Modulation for High-SNR Wavelength Conversion", IEEE Photonics Technology Letters, IEEE Service Center, Piscataway, NJ, US KNKD-DOI: 10.1109/LPD.2004.827112, vol. 16, No. 6, Jun. 1, 2004 (Jun. 1, 2004), pp. 1534-1536, XP011113268, ISSN:1041-1135.
(Continued)

*Primary Examiner* — Scott J Sugarman
*Assistant Examiner* — Sharrief Broome
(74) *Attorney, Agent, or Firm* — Nelson Mullins Riley & Scarborough LLP (57) ABSTRACT

An optical network element has a light source which provides an optical signal that is fed to at least two modulators. Each modulator provides an optical carrier signal that is conveyed to a receiving unit. The receiving unit is configured to determine a deviation signal between the optical carrier signal and a carrier conveyed via an incoming signal and to feed the deviation signal to the modulator for adjusting the frequency and/or the phase of the optical carrier signal. Also, a corresponding method for processing data and a communication system with at least one optical network are described.

15 Claims, 10 Drawing Sheets

(58) Field of Classification Search
USPC ............... 359/237–238, 278–279, 315, 245, 247,359/299, 310, 321, 248, 342, 344–345; 398/15, 398/33, 51, 94–95, 147, 182–183, 195–198, 204
See application file for complete search history.

(56) References Cited

U.S. PATENT DOCUMENTS

| | | | | |
|---|---|---|---|---|
| 5,825,464 | A * | 10/1998 | Feichtner | G01S 7/4813 356/4.02 |
| 7,002,895 | B1 * | 2/2006 | Taussig | G11B 7/007 369/275.1 |
| 8,050,351 | B2 * | 11/2011 | Cho | G02F 1/225 332/103 |
| 2002/0041422 | A1 * | 4/2002 | Mahlab | 359/238 |
| 2002/0181056 | A1 * | 12/2002 | Schemmann et al. | 359/161 |
| 2004/0208414 | A1 * | 10/2004 | Lee | H04J 14/08 385/14 |
| 2007/0133918 | A1 * | 6/2007 | Cho | G02F 1/225 385/1 |
| 2008/0309414 | A1 * | 12/2008 | Sai | H03K 3/0315 331/34 |
| 2009/0245787 | A1 * | 10/2009 | Fee et al. | 398/29 |

OTHER PUBLICATIONS

"Costas Loop" Wikipedia, 2 pages, http://de.wikipedia.org/wiki/Costas_Loop.
Michael Ellis: "The Linear Diode Detector for AM Demodelation"; 11 pages, 1999, http://michaelellis.tripod.com/mixerscom.html.

* cited by examiner

OPTICAL NETWORK ELEMENT

BACKGROUND OF THE INVENTION

Field of the Invention

The invention relates to an optical network element and to a method for processing data. Also, a communication system comprising at least one optical network is suggested.

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

Several PON types have been standardized and are currently being deployed by network service providers worldwide. Conventional PONs distribute downstream traffic from the optical line terminal (OLT) to optical network units (ONUs) in a broadcast manner while the ONUs send upstream data packets multiplexed in time to the OLT. Hence, communication among the ONUs needs to be conveyed through the OLT involving electronic processing such as buffering and/or scheduling, which results in latency and degrades the throughput of the network.

A Costas loop is a phase-locked loop used for carrier phase recovery from suppressed-carrier modulation signals, such as from double-sideband suppressed carrier signals. It is known in the art to use a Costas loop to determine a deviation between two optical carrier signals. Further details about the Costas loop could be found, e.g., at http://de.wikipedia.org/wiki/Costas_Loop or
http://michaelgellis.tripod.com/mixerscom.html.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers of around 1550 nm. Dense WDM uses the same transmission window but with denser channel spacing. Channel plans vary, but a typical system may use 40 channels at 100 GHz spacing or 80 channels with 50 GHz spacing. Some technologies are capable of 25 GHz spacing. Amplification options enable the extension of the usable wavelengths to the L-band, more or less doubling these numbers.

Optical access networks, e.g., coherent Ultra-Dense Wavelength Division Multiplex (UDWDM) networks, are deemed to be a promising approach for future data access.

Data transmission of spectrally densely spaced wavelengths is utilized by applications as Next Generation Optical Access (NGOA) systems allowing high data rates of, e.g., 100 Gbit/s.

In these optical scenarios, a multitude of optical wavelengths is required in order to be individually modulated. Such optical wavelengths may have a spectral distance of a few gigahertz and can be used either for a ultra dense wavelength grid optical access system like NGOA where each user may be assigned a wavelength of his own or for a transmission of high data rates such as 100 Gbit/s where a multitude of wavelengths are bundled and transmitted over a small spectral range.

Supplying such individual wavelengths by several discrete lasers leads to a huge amount of laser sources that require a significant amount of precision and thus involve high costs. As an alternative, modulating a multitude of single sidebands on an optical carrier also leads to significant costs because of the electronics involved needing to cope with high frequencies required.

BRIEF SUMMARY OF THE INVENTION

The problem to be solved is to overcome the disadvantages stated above and in particular to suggest an efficient solution for providing a multitude of optical wavelengths at a spectral distance of, e.g., a few GHz and at the same time allow for a precise adjustment of the optical wavelengths.

This problem is solved according to the features of the independent claims. Further embodiments result from the depending claims.

In order to overcome this problem, an optical network element is provided comprising a light source providing an optical signal that is fed to at least two modulators;

wherein each modulator provides an optical carrier signal that is conveyed to a receiving unit;

wherein the receiving unit is arranged to determine a deviation signal between the optical carrier signal and a carrier conveyed via an incoming signal; and to feed the deviation signal to the modulator for adjusting the frequency and/or the phase of the optical carrier signal.

It is noted that the optical network element may be a component comprising optical and electrical signal processing capabilities. The light source may be a laser or any laser source. The optical network element may comprise more than two modulators, wherein each modulator is connected to only one receiving unit. Hence, each modulator may provide the optical carrier signal, e.g., a local oscillator signal, for its receiving unit.

Advantageously, a single light source, e.g., laser, could be used to provide an optical signal for several receivers (also referred to as receiving units) of the optical network element. Each modulator can derive an optical carrier signal from the optical signal of the light source; each optical carrier signal (e.g., optical local oscillator signal) may have a different frequency offset from the frequency of the single mode laser's optical signal. This frequency and/or phase of the optical carrier signal can be adjusted by the deviation signal, which allows using an imprecise light source element.

The optical network element may be a centralized component of an optical network, in particular an optical line terminal (OLT) deployed, e.g., in a central office or cabinet.

The carrier conveyed via an incoming signal may comprise a carrier signal within an incoming UDWDM signal that is split towards the at least two modulators, wherein each receiver determines a deviation signal based on the actual difference between the optical carrier signal provided by the modulator that is associated with the particular receiver and one particular carrier signal of the UDWDM signal.

The deviation signal may be an electrical signal that is conveyed to the modulator to adjust the phase and/or frequency of the optical carrier signal.

In an embodiment, the modulator is an electrically operable optical modulator.

The modulator may comprise an electrically adjustable optical modulator, e.g., phase and/or frequency of such modulator may be adjusted in particular based on at least one electrical signal. The electrical signal may be used to adjust a frequency and/or phase shift and in particular to at least partially compensate any deviation conveyed by the deviation signal. In addition, the electrical signal can be used to set the frequency of the optical carrier signal relative to an offset of the frequency of the optical signal of the light source. Hence, the modulator can be set to various carrier frequencies to be used as local oscillator frequencies.

In another embodiment, the optical carrier signal has an offset relative to the optical signal of the light source.

Hence, the offset may be relative to the frequency of the optical signal provided by the light source.

In a further embodiment, the optical carrier signal of each of the at least two modulators provides a different offset.

In particular each modulator may provide a different offset relative to the optical signal of the light source thereby providing several local oscillator signals that are supplied to the several receivers for demodulating the incoming signal, e.g., the UDWDM signal.

In a next embodiment, the offset is adjustable by a control unit.

For example, the offset of each modulator may be adjusted by such control unit. This allows for optical carrier signals of different frequencies based on the single light source.

It is also an embodiment that the deviation signal is determined or generated via a Costas loop.

It is noted that instead of the Costas Loop a phase-locked loop (PLL) could be used. Also, any solution that allows for demodulation via periodically triggering a pulse (e.g., of constant duration) by a zero crossing of an ac voltage could be applied. This may lead to pulse width modulation, which preferably is processed by a low pass to reduce portions of high frequency (smoothing) in order to obtain an analog demodulation signal. In addition, mechanisms of phase discrimination or demodulation utilizing feedback loops could be applied. Also frequency modulation techniques could be utilized, wherein some aspects of frequency modulation could be applied to phase modulation techniques as a frequency modulation differentiated with respect to time can be regarded as phase modulation.

Pursuant to another embodiment, the modulator comprises a frequency shifter that is arranged to process the deviation signal from the receiving unit.

The frequency shifter may be realized as or comprise a voltage controlled oscillator (VCO) that can be used for integrating the deviation signal, i.e. adjusting the frequency according to an integrating portion of a control mechanism. Hence, mid-term or long-term changes of the frequency can be compensated by this frequency shifter.

The frequency shifter is arranged to adjust the frequency of the optical carrier signal.

According to an embodiment, the modulator comprises a phase modulator that is arranged to process the deviation signal from the receiving unit.

The phase modulator is arranged to adjust the frequency and/or phase of the optical carrier signal. A change of phase over time corresponds to a change of frequency. The phase modulator can be used to compensate short-term frequency deviations, hence adjusting the frequency according to a proportional portion of a control mechanism.

According to another embodiment, the phase modulator comprises at least one of the following:
    a semiconductor optical amplifier;
    an element comprising indium phosphide;
    an element comprising lithium niobate.

The problem stated above is further solved by a communication system comprising at least one optical network element as described herein.

The problem mentioned above is also solved by a method for processing data,
    wherein an optical signal provided by a light source is fed to at least two modulators;
    wherein each modulator provides an optical carrier signal that is conveyed to a receiving unit;
    wherein the receiving unit determines a deviation signal between the optical carrier signal and a carrier conveyed via an incoming signal; and
    wherein the deviation signal is conveyed to the modulator for adjusting the frequency and/or the phase of the optical carrier signal.

It is noted that the features described with regard to the device above are applicable for the method in an analog manner.

According to an embodiment, each the optical carrier signals of each modulator has a different offset relative to the frequency of the optical signal of the light source.

According to a further embodiment, the offset is adjusted for at least one of the modulators by a control unit.

In yet another embodiment, the modulator comprises a frequency shifter that adjusts the optical carrier signal based on the deviation signal obtained from the receiving unit.

According to a next embodiment, the modulator comprises a phase modulator that adjusts the optical carrier signal based on the deviation signal obtained from the receiving unit.

DESCRIPTION OF THE INVENTION

Figure 9:
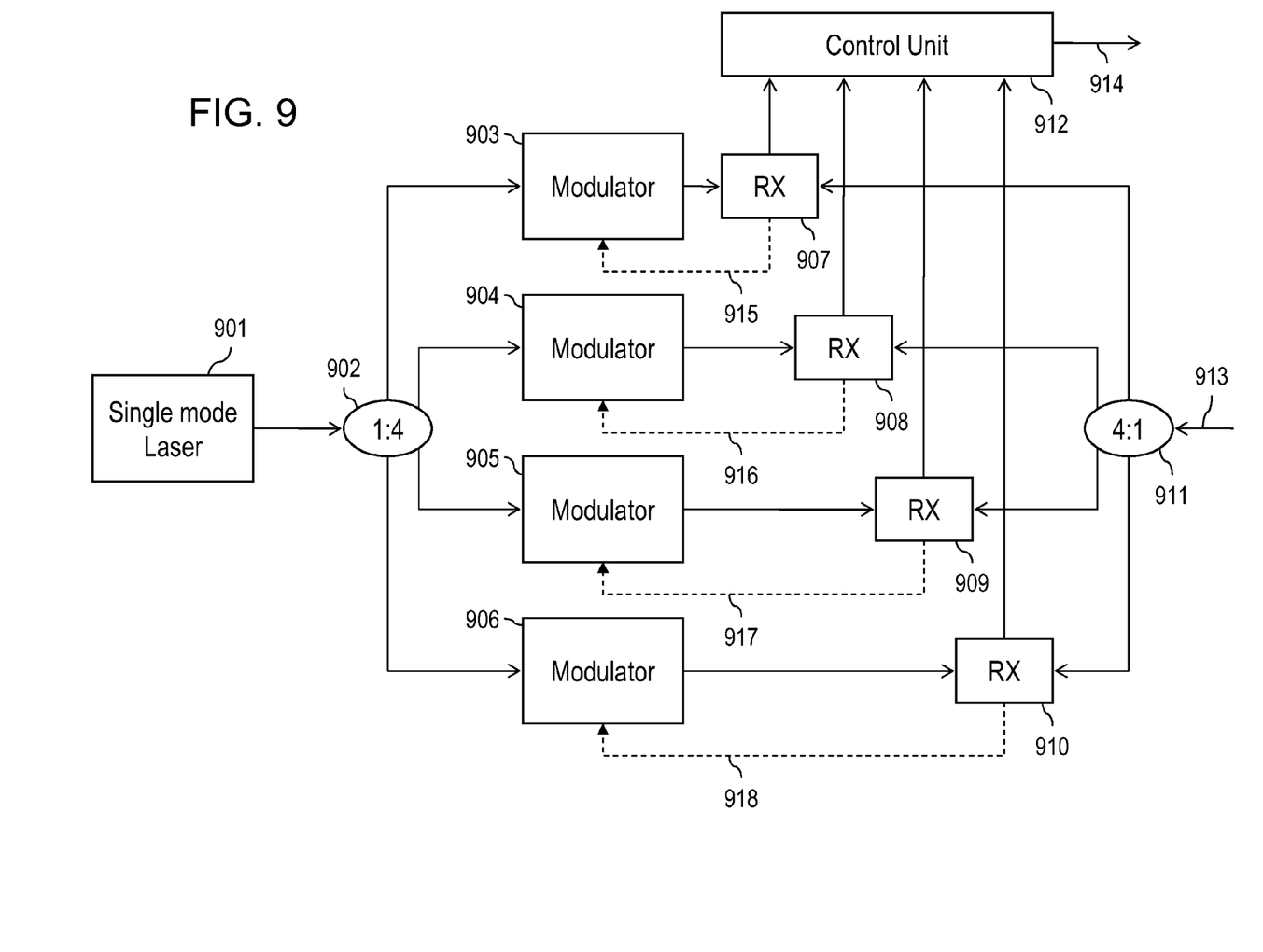
FIG. 9 shows a multi-channel receiver that can be utilized, e.g., in case electrical and/or optical frequency splitting is not identical for transmitter and receiver and in case separate frequency and/or phase control of the optical local oscillator is required.

FIG. 9 shows a multi-channel receiver that can be utilized, e.g., in case electrical and/or optical frequency splitting is not identical for transmitter and receiver and in case separate frequency and/or phase control of the optical local oscillator is required.

In FIG. 9, a single mode laser 901 conveys a light signal via a 1:4-splitter 902 to modulators 903 to 906. Each modulator 903 to 906 may comprise an electrically controlled optical modulator, e.g., a single sideband modulator to provide a local oscillator signal at a predetermined frequency towards a connected receiver 907 to 910. Hence, each receiver 907 to 910 can be supplied with an optical local oscillator signal at a different (e.g., preset) frequency.

The modulator 903 to 906 may be any optical modulator that can be adjusted by at least one electrical signal.

An example as how to generate several such optical local oscillator signals from a single light source, e.g., the single mode laser 901, will be shown and described below.

On the other hand, each receiver 907 to 910 is connected to a splitter 911, to which an optical signal 913 is fed. This optical signal 913 may comprise several carrier frequencies, each being modulated with user data; the optical signal 913 may thus be a UDWDM signal with adjacent optical carriers, each conveying user data, e.g., from an optical network unit (ONU) or any subscriber. The user data modulated on each optical carrier of the optical signal 913 may be a portion of a data stream that can be combined via the several receivers 907 to 910.

It is noted that the component schematically depicted in FIG. 9 may be an optical line terminal (OLT) or any combining unit deployed, e.g. at a cabinet or central office.

Each receiver 907 to 910 is able to determine a deviation of the local oscillator signal provided by its associated modulator 903 to 906 and a carrier frequency obtained from the optical signal 913. Thus, the receiver 907 to 910 may convey information regarding such deviation via a respective signal 915 to 918 to the modulator 903 to 906. Based on this signal 915 to 918 the modulator 903 to 906 adjusts the local oscillator signal fed to the receiver 907 to 910 to reduce or at least partially compensate such deviation.

The signal 915 to 918 indicating the deviation can be determined at the receiver 907 to 910 by utilizing a Costas loop.

The arrangement shown in FIG. 9 thus allows for homodyne reception.

The receivers 907 to 910 process the incoming optical signal 913 using different local oscillator signals and convey a demodulated electrical signal towards a control unit 912, which may, e.g., combine the several electrical signals from the receivers 907 to 910 into a combined electrical signal 914 (e.g., a combined data stream).

As an alternative, the control unit 912 may also process the signals provided by the receivers 907 to 910 separately.

Advantageously, the approach provided allows improving the spectral accuracy of the local oscillator signal even in case the single mode laser 901 merely provides an optical signal with an imprecise linewidth or in case the single mode laser 901 is fluctuating, e.g., changing its frequency over time and/or due to temperature changes. The modulator 903 to 906 not only provides a stable frequency of the local oscillator signal, but also a sharp spectral linewidth.

Figure 10:
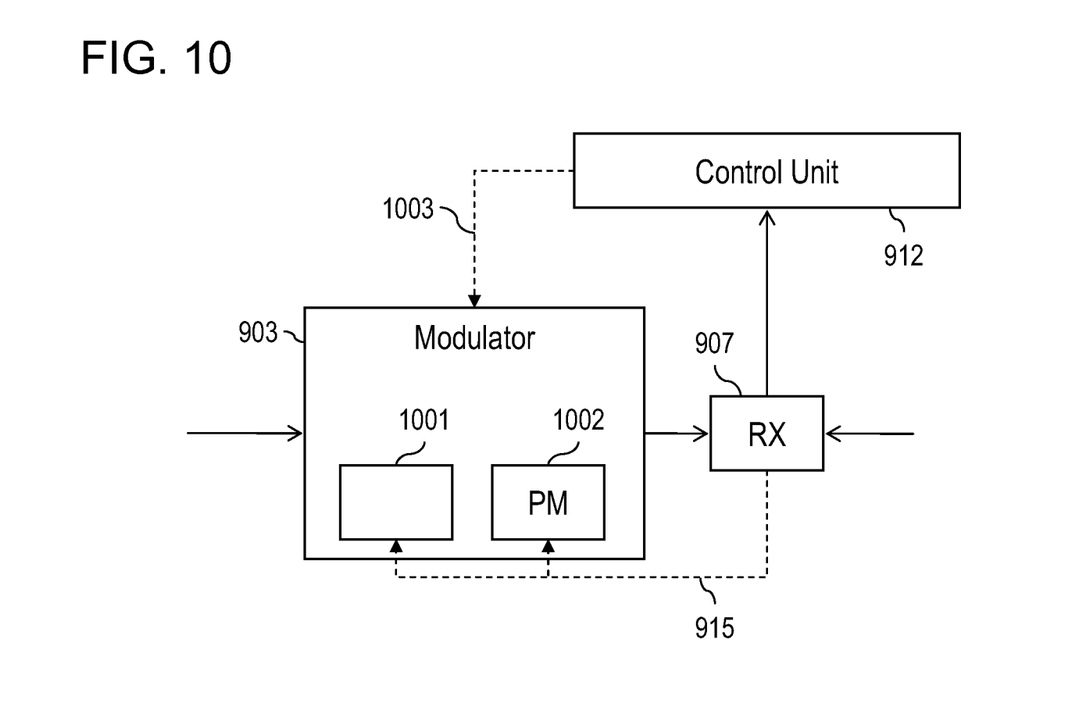
FIG. 10 shows a more detailed schematic comprising the modulator and the receiver in combination with the control unit of FIG. 9.

FIG. 10 shows a more detailed schematic comprising the modulator 903 and the receiver 907 in combination with the control unit 912 of FIG. 9. It is noted, however, that this applies for the remaining modulators 904 to 906 and receivers 908 to 910 accordingly.

As indicated above, the modulator 903 is supplied by the single mode laser with the light signal that is modulated (or converted) into a local oscillator signal to be fed to the receiver 907. The receiver 907 provides the signal 915 to the modulator 903, which can be used to adjust phase and/or frequency of the local oscillator signal. It is noted that the signal 915 may be an electrical signal.

The signal 915 is fed to a frequency shifter 1001, in particular comprising a voltage controlled oscillator, of the modulator 903, which compensates slow frequency variations. In addition, the signal 915 is fed to a phase modulator 1002, which compensates fast frequency variation. In particular the combination of the frequency shifter 1001 and the phase modulator 1002 allows for a stable optical local oscillator signal. It is noted that compensating also refers to at least partially reducing or in particular fully reducing any (undesired) variation.

The frequency shifter 1001 corresponds to an integrating portion of a control and the phase modulator 1002 corresponds to a proportional portion of a control.

The phase modulator 1002 could be an element comprising an optical length, which may be modified by applying a voltage to this element. The phase modulator could be realized as or comprise a semiconductor optical amplifier (SOA). The phase modulator may also comprise indium phosphide or lithium niobate.

It is noted that instead of the frequency shifter 1001 any control element that allows adjusting the frequency of the modulator 903 could be utilized. Due to the slow control compared to the fast control provided by the phase modulator 1002, the frequency shifter 1001 (or any similar control element) may ensure that the phase modulator 1002 operates in a suitable range, e.g., by shifting the frequency such that the correction capability of the phase modulator 1002 could be efficiently employed.

In addition, the control unit 912 may be used to convey a control signal 1003 to the modulator 903 adjusting the frequency of the local oscillator (not shown in FIG. 9). This may apply for all modulators 903 to 906 shown in FIG. 9 accordingly (with different control signals, not shown).

The control signal 1003 adjusts the frequency offset of the optical carrier relative to a frequency of the single mode laser 901. Hence, the control unit 912 by supplying such control signals to the various modulators 903 to 906 (see FIG. 9) allows flexibly adjusting the frequency offset and hence the frequency of the optical local oscillator signal provided by each modulator 903 to 906.

Hereinafter, it will be shown in more detail as how to obtain several optical local oscillator signals from a light signal of a single mode laser (or any suitable light source), wherein each optical local oscillator signal may have, e.g., a different frequency offset from the frequency of the single mode laser's light signal. In addition to merely providing such several carrier signals that could be used as local oscillator signal, e.g., in an OLT, these several carrier signals are also frequency and/or phase controlled as shown above. This allows efficiently operating the optical network element, e.g., OLT, using a rather imprecise light source as, e.g., the single mode laser.

Generating Local Oscillator Signals

It is in particular suggested to use both outputs of a single sideband modulator (SSBM), wherein several such modulators could be connected in series or in parallel such that based on an input from a single light source (i.e. a single carrier) several carriers (frequencies) could be generated that are spaced apart from each other by, e.g., only a few gigahertz. These frequencies (or wavelengths) could be individually modulated and thus utilized for NGOA systems or UDWDM networks.

The SSBM could be realized as a two-beam interferometer, e.g., a Michelson interferometer, in particular by a Mach-Zehnder Modulator (MZM).

Figure 1:
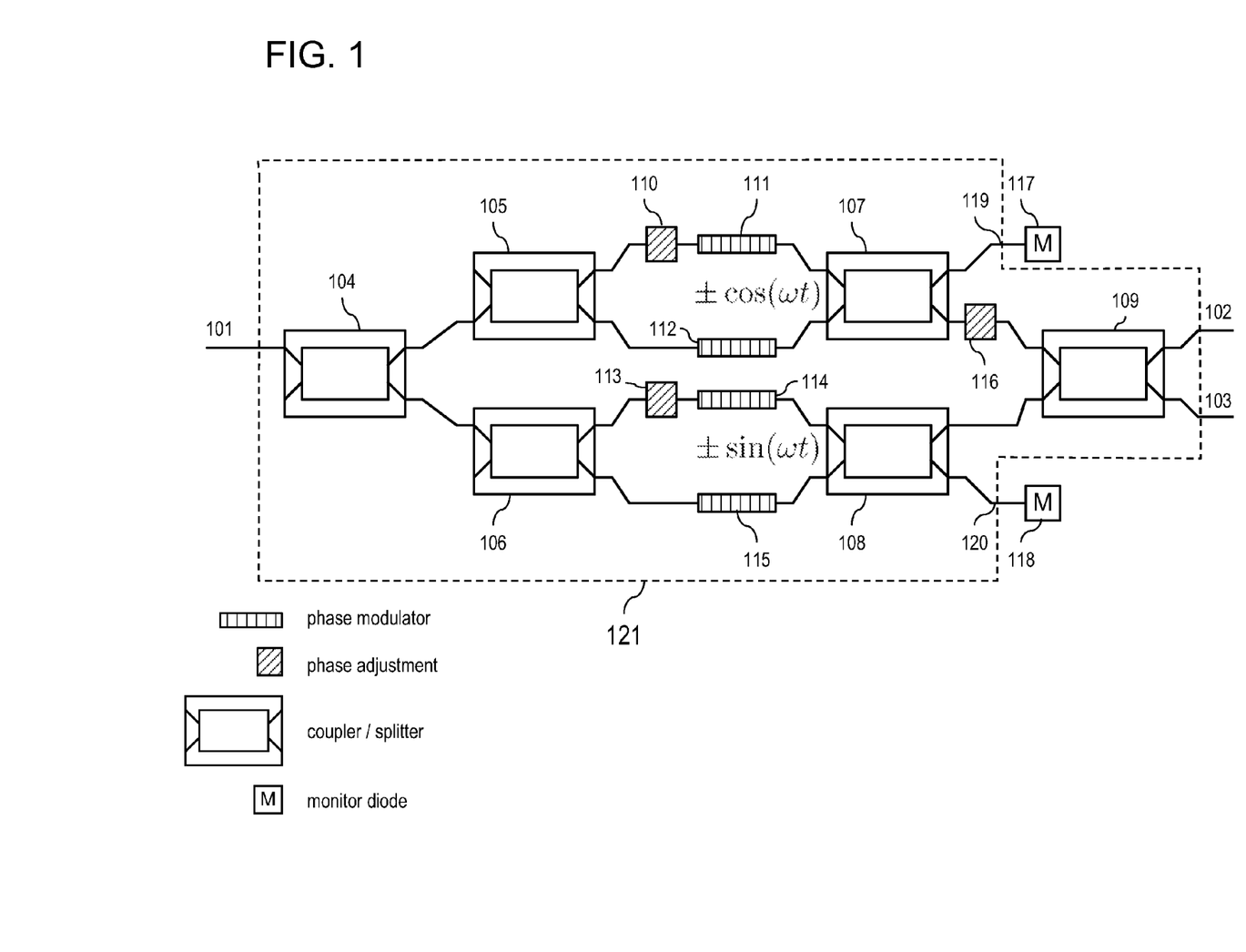
FIG. 1 shows an optical modulator that supplies optical carriers relative to a frequency of a light source input to the optical modulator.

FIG. 1 shows a modulator structure comprising a coupler 104 (also referred to as splitter) to which an input signal (light) 101 is fed. The coupler 104 is further connected to a coupler 105 and to a coupler 106, thereby conveying the input signal 101.

The coupler 105 conveys the incoming light via a phase adjustment 110 and a phase modulator 111 to a coupler 107 and also directly via a phase modulator 112 to said coupler 107.

Accordingly, the coupler 106 conveys the incoming light via a phase adjustment 113 and a phase modulator 114 to a coupler 108 and also directly via a phase modulator 115 to said coupler 108.

The output of the coupler 107 is fed via a terminal 119 to a monitor diode 117 and via a phase adjustment 116 to a coupler 109. The output of the coupler 108 is fed via a terminal 120 to a monitor diode 118 and to the coupler 109.

The coupler 109 provides two output signals 102 and 103. The modulator unit with its input and output ports 101, 102, 103, 119 and 120 is also depicted as a block 121, which will be used as such in the figures below.

The output signal 103 contains the same modulated data as does the output signal 102, but on the opposite spectral side of the carrier signal 101.

The modulator 121 is driven at a frequency ω, e.g., 5 GHz. The light of the output signal 102 is offset by +5 GHz and the light of the output signal 103 is offset by −5 GHZ from the carrier frequency.

As the driving signals are single frequencies, both the driving circuit and the electrode structure can be tailored to the respective frequency (e.g., by using resonant circuits), thus easing the requirements for the electronics.

The modulator 121 can be adjusted such that the carrier is in principle completely eliminated. In practice, without additional measures, the degree of carrier elimination is limited by the symmetry of the interferometer arms visible in a finite extinction ratio if the modulator is used as an amplitude modulator. A counter measurement against poor carrier suppression caused by poor symmetry of the modulator can be a slight misadjustment of the phase bias in the modulator arm with better extinction ratio.

The carrier is directed to the outputs which contain the monitor diodes 117, 118, which can be used for adequate adjustment of the bias phases. The carrier can, in some cases, also be used for further processing purposes.

To avoid strong distortions by harmonics, the best compromise between SSB generation efficiency and low harmonics seems to be a modulation depth of about 90° to 110° resulting in an efficiency of about 30%.

Figure 8:
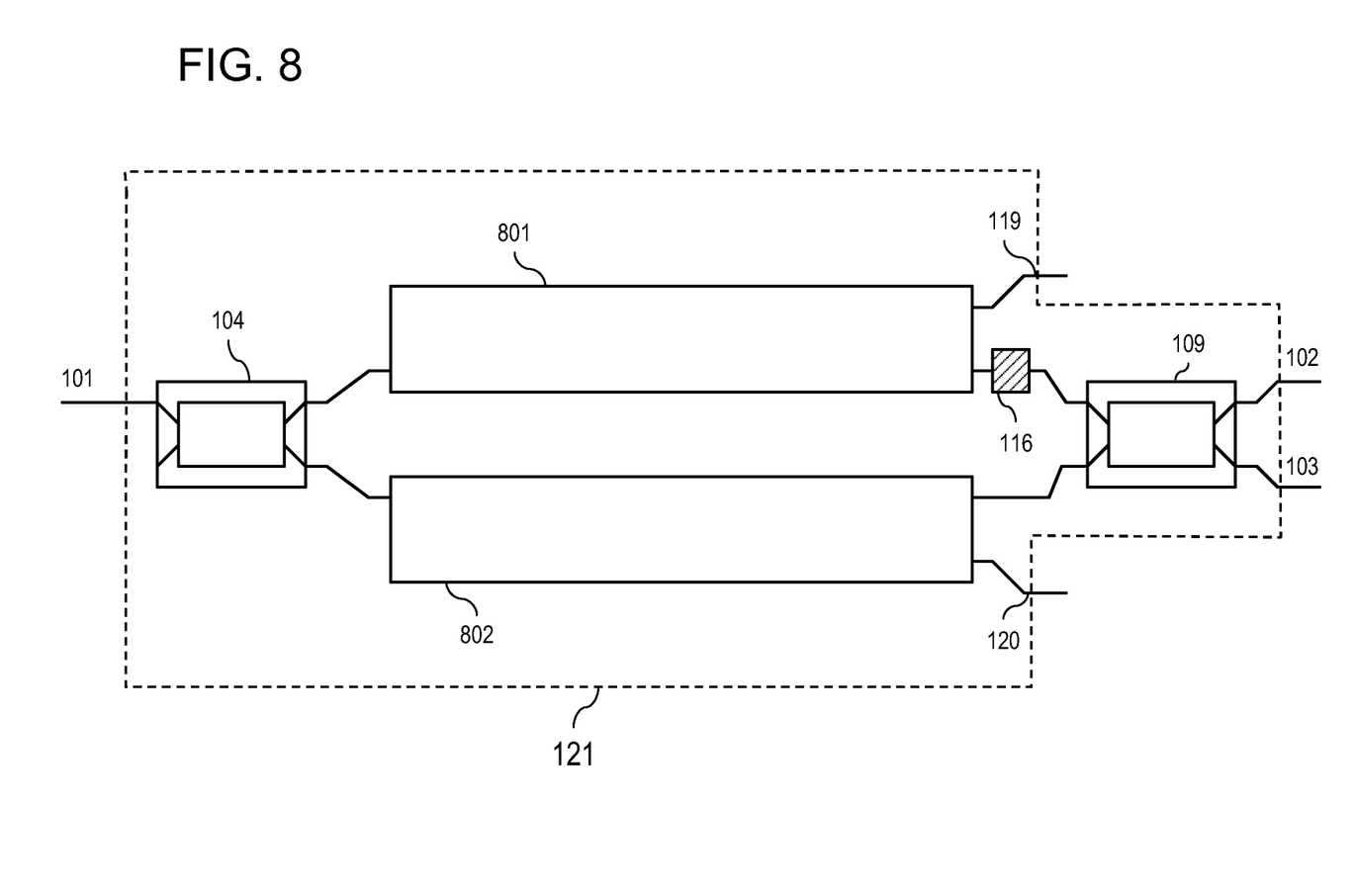
FIG. 8 shows a more generalized structure as FIG. 1, wherein instead of the MZM different modulator schemes may apply as indicated by two modulator branches.

FIG. 8 shows a more generalized structure as FIG. 1. Instead of the MZM mentioned, different modulator schemes may apply as indicated by blocks 801 and 802.

A first branch 801 provides an amplitude modulation with a first signal, said first signal being substantially sinusoidal. In addition, the first branch provides a phase shift, i.e., a 180-degree phase shift at the zero-crossing of the optical signal. A second branch 802 provides an amplitude modulation with a second signal, wherein the second signal is substantially 90 degree phase shifted compared to the first signal. For example, the first signal may be a sinus with a predefined frequency and the second signal may be a cosine with the same frequency. Due to the phase adjustment 116, the signals that are fed to the coupler 109 have an optical phase difference of (substantially) 90 degrees.

It is noted that hereinafter the modulator 121 may be realized as shown and explained in FIG. 1 or FIG. 8.

Figure 2:
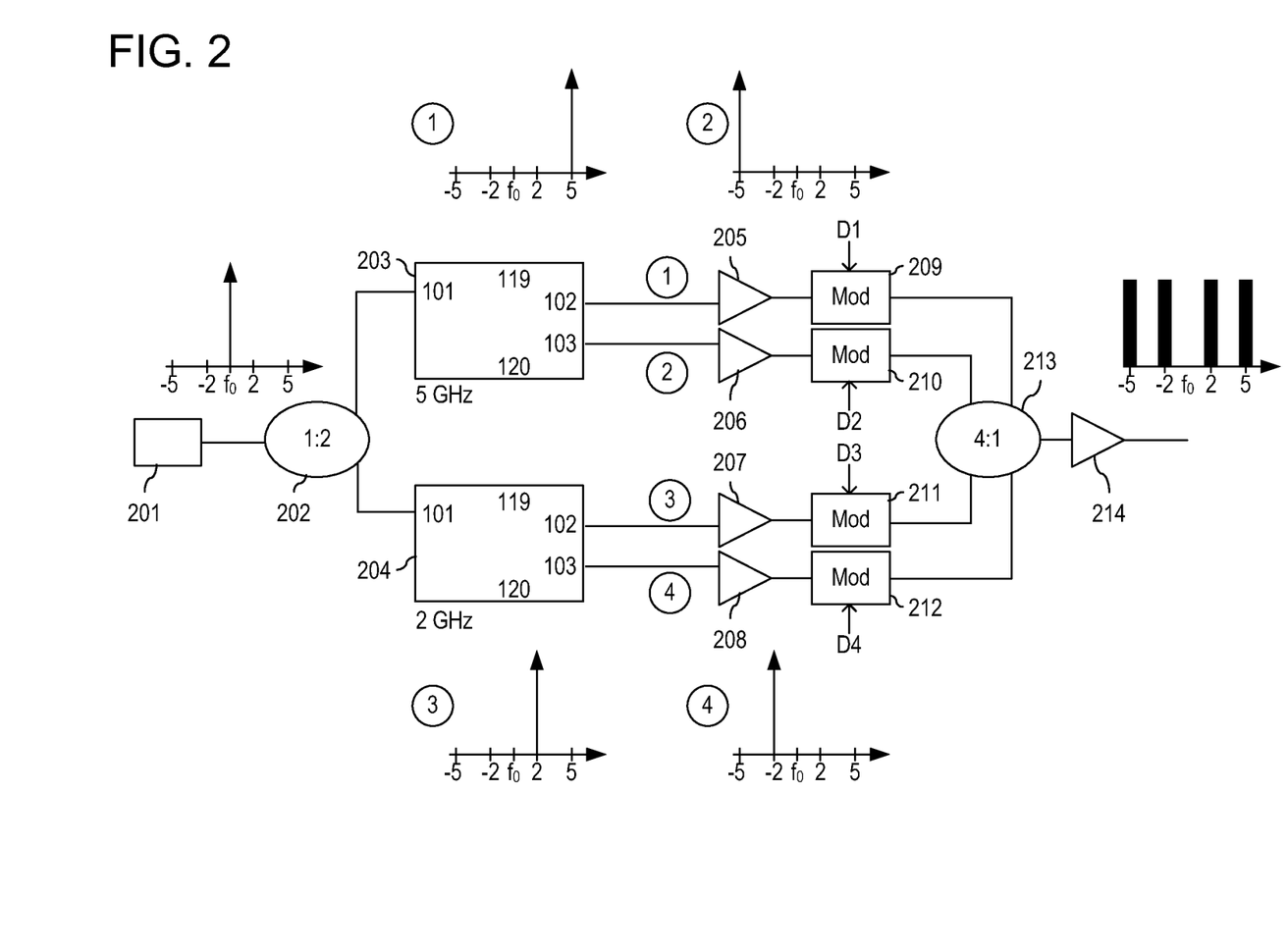
FIG. 2 shows a schematic block diagram comprising an exemplary optical multi-channel generator.

FIG. 2 shows a schematic block diagram comprising an exemplary optical multi-channel generator.

A single mode laser 201 feeds an optical signal via a splitter 202 to a modulator 203 and to a modulator 204. Each of the modulators 203 and 204 corresponds to the modulator 121 as shown in FIG. 1. The modulator 203 operates at a frequency of 5 GHz and the modulator 204 operates at a frequency of 2 GHz.

The output signal of the modulator 203 provides a frequency with an offset of 5 GHz, which is fed via an optical amplifier 205 to a modulator 209 where it is modulated with a data signal D1. The output of the modulator 209 is conveyed to a combiner 213. Accordingly, another output signal of the modulator 203 provides a frequency with an offset of −5 GHz, which is fed via an optical amplifier 206 to a modulator 210 where it is modulated with a data signal D2. The output of the modulator 210 is conveyed to the combiner 213.

Also the output signal of the modulator 204 provides a frequency with an offset of 2 GHz, which is fed via an optical amplifier 207 to a modulator 211 where it is modulated with a data signal D3. The output of the modulator 211 is conveyed to the combiner 213. Accordingly, another output signal of the modulator 203 provides a frequency with an offset of −2 GHz, which is fed via an optical amplifier 208 to a modulator 212 where it is modulated with a data signal D4. The output of the modulator 212 is conveyed to the combiner 213.

The output of the combiner 213 is fed to an optical amplifier 214.

Hence, the modulator 203 generates two wavelengths with an offset of 5 GHz and −5 GHz from the carrier, i.e. the frequency of the single mode laser 201. The modulator 204 generates two wavelengths with an offset of 2 GHz and −2 GHz from the carrier. Each of the four outputs from the modulators 203 and 204 is then individually modulated with a data signal D1 to D4 at the data baseband and the four modulated signals are combined for transmission purposes.

The optical amplifiers 205 to 208 and 214 can be included in the structure; their dimensioning may in particular depend on the optical power budget.

Figure 3:
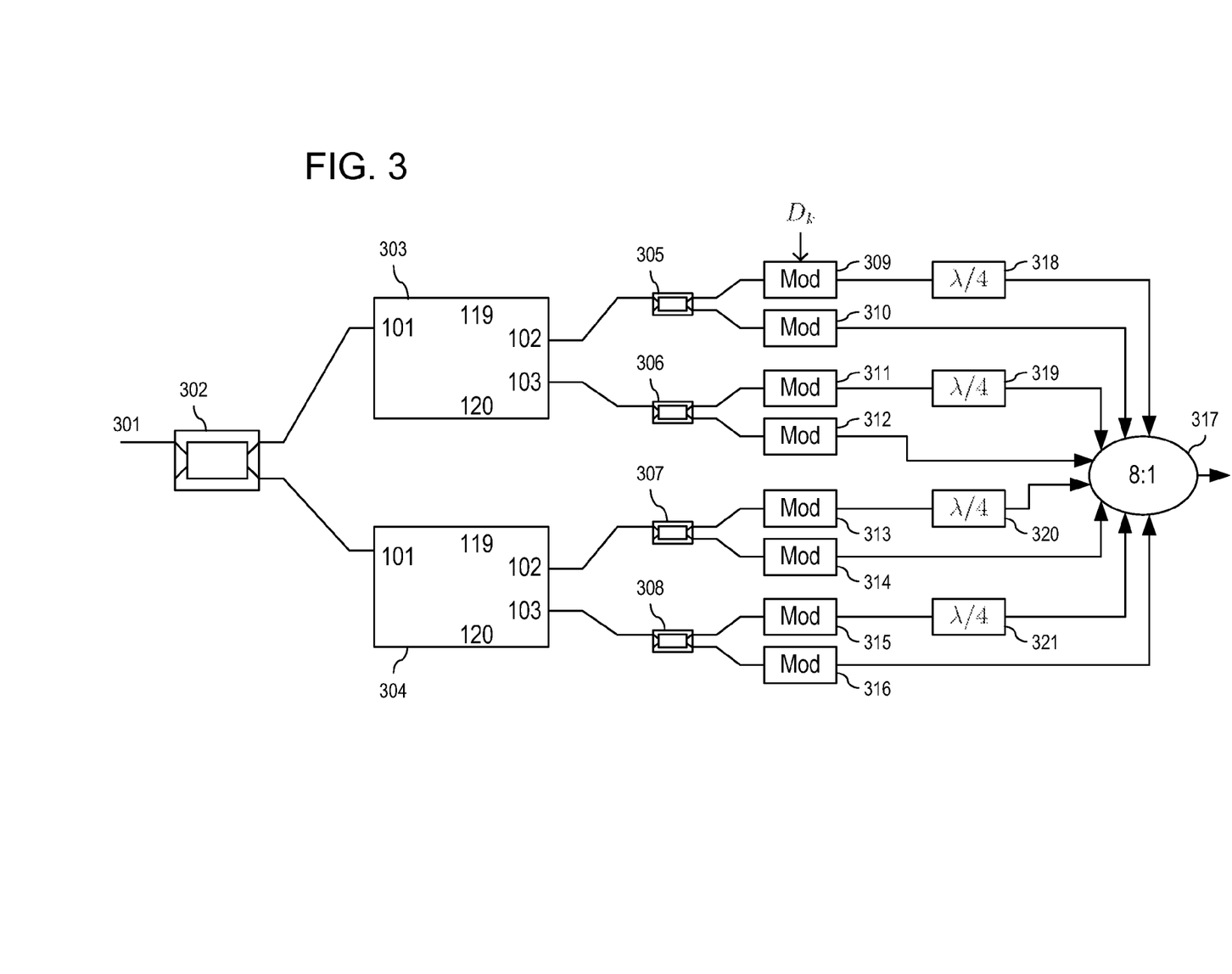
FIG. 3 shows a schematic diagram, wherein the structure of FIG. 2 is extended to provide polarization multiplex (PolMux)

FIG. 3 shows a schematic diagram, wherein the structure of FIG. 2 is extended to provide polarization multiplex (PolMux).

An optical signal 301 is fed to a splitter 302 and further to a modulator 303 and to a modulator 304. Each of the modulators 303 and 304 corresponds to the modulator 121 as shown in FIG. 1.

The output signals of the modulator 303 are fed via splitters 305, 306 to modulators 309 to 312 where they are modulated with data signals $D_k$ (k=1 . . . 4). Each output of the modulators 309, 311 is conveyed via a λ/4 polarization converter 318, 319 to a combiner 317 and each output of the modulators 310, 312 is directly conveyed to the combiner 317.

Accordingly, output signals of the modulator 304 are fed via splitters 307, 308 to modulators 313 to 316 where they are modulated with data signals $D_k$ (k=5 . . . 8). Each output of the modulators 313, 315 is conveyed via a λ/4 polarization converter 320, 321 to the combiner 317 and each output of the modulators 314, 316 is directly conveyed to the combiner 317.

Figure 4:
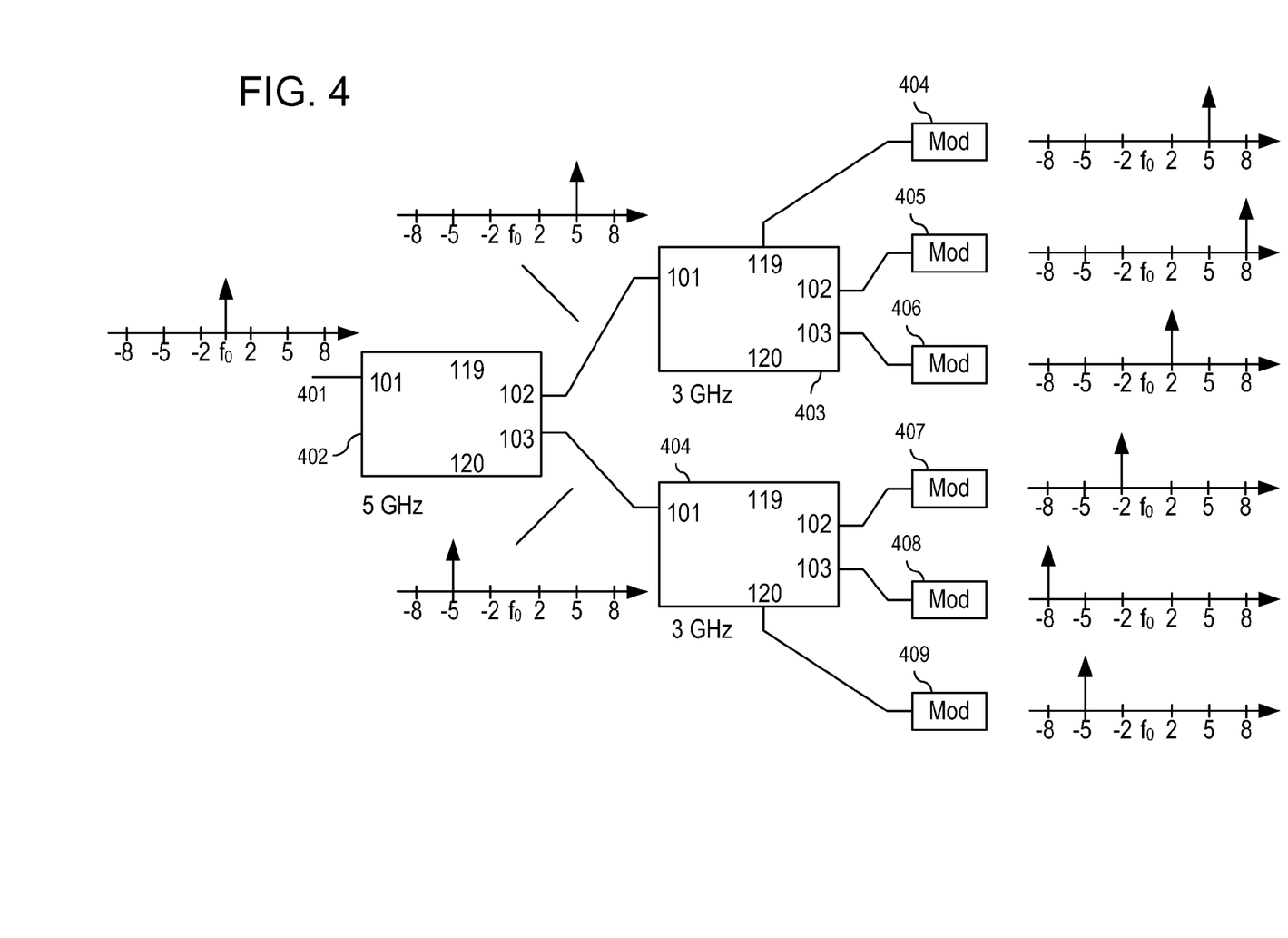
FIG. 4 shows an alternative block structure of an optical multi-channel generator providing six carriers.

FIG. 4 shows an alternative block structure of an optical multi-channel generator providing six carriers.

An optical signal 401 is fed to a modulator 402 and further to a modulator 403 and to a modulator 404. Each of the modulators 402 to 404 corresponds to the modulator 121 as shown in FIG. 1. The modulator 402 operates at a frequency of 5 GHz and the modulators 403, 404 each operates at a frequency of 3 GHz.

The output of the modulators 403 and 404 provides the carrier frequencies as shown on the right hand side, i.e. amounting to 5 GHz, 8 GHz, 2 GHz, −2 GHz, −8 GHz and −5 GHz relative to the frequency $f_0$ of the carrier frequency provided by the optical signal 401.

Each output signal of the modulators 403 and 404 is modulated with data signals (not shown in FIG. 4) via modulators 404 to 409.

Both the parallel and the cascaded solution can be combined for a higher number of carrier frequencies to be provided. Also polarization multiplex could be combined if required.

Figure 5:
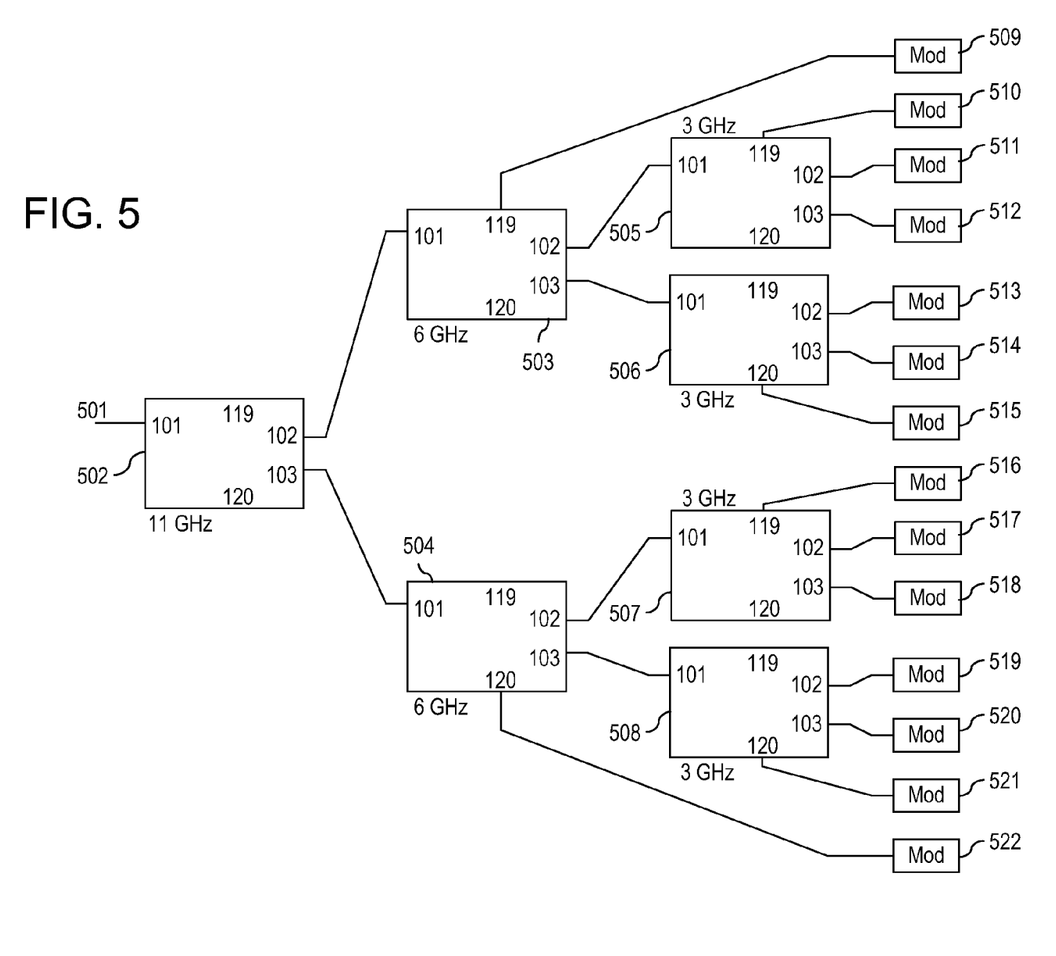
FIG. 5 shows another schematic block structure of an optical multi-channel generator providing 14 carriers.

FIG. 5 shows another schematic block structure of an optical multi-channel generator providing 14 carriers.

An optical signal 501 is fed to a modulator 502, next to a modulator 503 and to a modulator 504 and further to modulators 505 to 508. Each of the modulators 502 to 508 corresponds to the modulator 121 as shown in FIG. 1. The modulator 502 operates at a frequency of 11 GHz, the modulators 503, 504 each operates at a frequency of 6 GHz and the modulators 505 to 508 each operates at a frequency of 3 GHz.

The output of the modulators provides carrier frequencies amounting to 11 GHz, 17 GHz, 20 GHz, 14 GHz, 8 GHz, 2 GHz, 5 GHz and −11 GHz, −17 GHz, −20 GHz, −14 GHz, −8 GHz, −2 GHz, −5 GHz relative to the frequency $f_0$ of the carrier frequency provided by the optical signal 501.

The output signals of the modulators are modulated with data signals (not shown in FIG. 5) via modulators 509 to 522.

Figure 6:
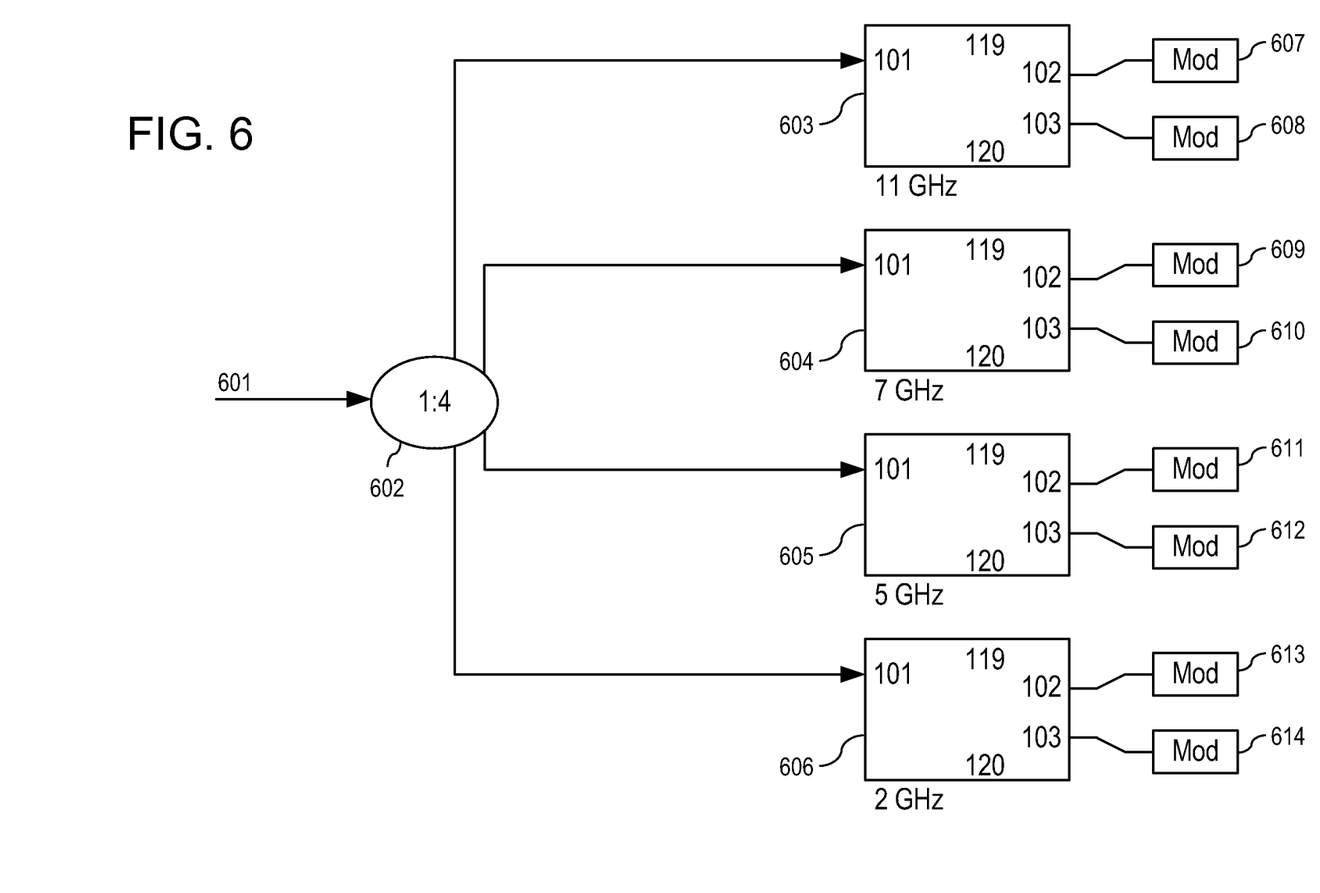
FIG. 6 shows a further schematic block structure of an optical multi-channel generator with a parallel structure providing 8 carriers.

FIG. 6 shows a further schematic block structure of an optical multi-channel generator with a parallel structure providing 8 carriers.

An optical signal 601 is fed to a 1:4 splitter 602 and further to a modulator 603 with an operating frequency of 11 GHz, to a modulator 604 with an operating frequency of 7 GHz, to a modulator 605 with an operating frequency of 5 GHz and to a modulator 606 with an operating frequency of 2 GHz. Each of the modulators 603 to 606 corresponds to the modulator 121 as shown in FIG. 1.

The output signals of the modulators 603 to 606 are modulated with data signals (not shown in FIG. 6) via modulators 607 to 614.

It is noted that the combining of the data signal-modulated wavelengths is not shown in FIG. 4 to FIG. 6 for legibility reasons. However, as a final stage (according to FIG. 2 and FIG. 3), a combiner can be provided that conveys all wavelengths onto a single fiber.

It is further noted that as an option, optical amplifiers may be supplied for power regeneration purposes. Such optical amplifiers may be provides as SOAs (semiconductor optical amplifiers) allowing integrating of all structures in InP.

It is also an option that the modulation signal which is modulated onto the generated wavelengths comprises several n sub-carriers itself, thus multiplying the number of wavelengths generated by the whole transmitter by n.

This can be achieved using the MZM (or a Michelson interferometer based, in general a two-way interferometer based IQ modulator) by applying electrical signals $D_k$ as depicted in FIG. 2 or in FIG. 3 with two or more signals in a baseband and additional electrical carriers. Preferably, a total phase modulation index may not exceed a value leading to a high harmonic generation, in case of a simple design without electronic pre-distortion the total modulation index may be below 110°.

A numeric example for generating eight wavelengths with frequency offsets compared to a carrier laser source according to FIG. 2 is as follows: Driving the modulator 203 with a frequency amounting to 0.5 GHz and the modulator 204 with a frequency amounting to 6.5 GHz delivers frequency offsets of ±0.5 GHz and ±6.5 GHz at the outputs of the modulators 203, 204. Using carriers at the data modulation portion amounting to 1.5 GHz and 4.5 GHz an output of optical carriers may amount to ±2 GHz, ±5 GHz, ±8 GHz and ±11 GHz.

Schematic of a Transceiver

Figure 7:
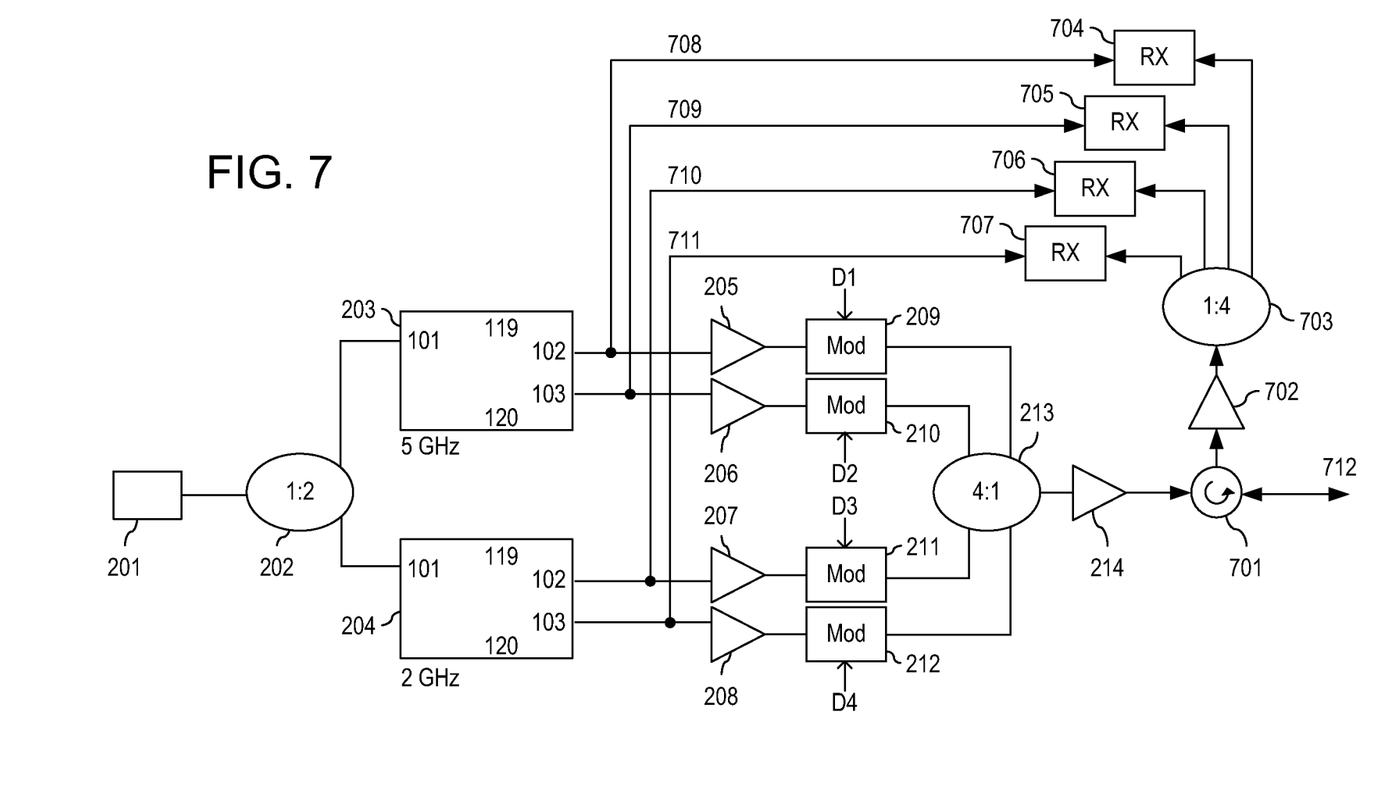
FIG. 7 shows a schematic diagram comprising a four channel transceiver to be used in an OLT, wherein the transceiver comprises the optical multi-channel generator as shown in FIG. 2.

FIG. 7 shows a schematic diagram comprising a four channel transceiver to be used in an OLT. The transceiver comprises the optical multi-channel generator as shown in FIG. 2.

In addition to FIG. 2, the output of the optical amplifier is fed to a circulator 701, which is also connected to a fiber 712. Further, the circulator 702 is connected via an optical amplifier 702 to a 1:4 splitter 703 conveying incoming signals towards receivers 704 to 707.

Each of the receivers 704 to 707 receives an optical local oscillator signal 708 to 711, which is supplied by the optical multi-channel generator. Hence, the optical multi-channel generator is used for modulating the outgoing data signals D1 to D4 and for demodulating incoming signals conveyed to the receivers 704 to 707.

This approach also reduces electrical requirements at the coherent receiver by using a multi-wavelength optical local oscillator with multiple optical outputs each carrying one wavelength. A single local oscillator wavelength 704 to 707 is used for selection and demodulation of one optical channel or a subset of optical channels.

Further Advantages

The solution provided could be applied to, e.g., 100 G systems. The combination of four wavelengths, polarization multiplex and DQPSK results in 4×2×6.25 GSymbols/s which corresponds to 100 Gbit/s. In this arrangement the data processing speed, respectively the bandwidth of electrical circuitry, analog-to-digital converters and digital-to analog-converters may cope with a processing speed of 6.25 Gbit/s, which is a significant reduction for a 100 G solution.

Hence, the solution requires less bandwidth for electrical circuitry, in particular with regard to analog-to-digital converters and digital-to-analog converters in case of digital processing.

The concept suggested is highly scalable to flexibly provide an appropriate number of wavelengths.

The costs of the overall system could be reduced by optimizing the number of optical components required (i.e. the chip-size) in view of electrical bandwidth requirements.

LIST OF ABBREVIATIONS

DQPSK Differential QPSK
HF High Frequency
MZM Mach-Zehnder Modulator

NGOA Next Generation Optical Access
OLT Optical Line Terminal
PolMux Polarization Multiplex
PSK Phase Shift Keying
QPSK Quadrature PSK
SSB Single Sideband
SSBM SSB Modulator
GNU Optical Network Unit
PLL Phase-Locked Loop
PON Passive Optical Network
FTTH Fiber-to-the-Home
FTTB Fiber-to-the-Business
FTTC Fiber-to-the-Curb
WDM Wavelength Division Multiplexing
UDWDM Ultra Dense WDM

The invention claimed is:

1. An optical network element, comprising:
a multi-channel coherent receiver, comprising:
a light source providing an optical signal;
at least two modulators disposed to receive the optical signal from said light source, each said modulator modulating the optical signal to produce an optical carrier signal as a local oscillator signal with a different frequency offset relative to the optical signal of said light source;
at least two receiving units for processing an incoming ultra dense wavelength division multiplex (UDWDM) optical signal conveying at least two carrier signals and for providing associated demodulated electrical signals, each of said receiving units being disposed to obtain an associated carrier signal among the carrier signals conveyed via said incoming UDWDM optical signal and to receive the local oscillator signal from an associated one of said modulators, each of said receiving units being configured:
to determine a deviation signal based on a difference in frequency and/or phase between the local oscillator signal of the associated modulator and the associated carrier signal conveyed via said incoming UDWDM optical signal; and
to feed the deviation signal to the associated modulator for adjusting a frequency and/or a phase of the local oscillator signal to reduce the difference in frequency and/or phase.

2. The optical network element according to claim 1, wherein the modulators are electrically operated optical modulators.

3. The optical network element according to claim 1, wherein the frequency offset is adjustable by a control unit.

4. The optical network element according to claim 1, wherein said receiving unit is configured to determine or generate the deviation signal via a Costas loop.

5. The optical network element according to claim 1, wherein each of said modulators comprises a frequency shifter configured to adjust the frequency of the local oscillator signal according to the deviation signal from said receiving unit.

6. The optical network element according to claim 1, wherein each of said modulators comprises a phase modulator configured to adjust the frequency and/or phase of the local oscillator signal according to the deviation signal from said receiving unit.

7. The optical network element according to claim 6, wherein said phase modulator comprises at least one of the following:
a semiconductor optical amplifier;
an element comprising indium phosphide; and
an element comprising lithium niobate.

8. A communication system, comprising at least one optical network element according to claim 1.

9. A method for processing data, the method performed in a coherent receiver of an optical network element which comprises:
with the receiver:
feeding an optical signal provided by a light source to at least two modulators;
providing with each of said at least two modulators a local oscillator signal with a different frequency offset relative to the frequency of the optical signal of the light source signal and conveying the local oscillator signal to an associated receiving unit;
processing at each receiving unit an incoming ultra dense wavelength division multiplex (UDWDM) optical signal conveying at least two carrier signals and providing at each receiving unit an associated demodulated electrical signal;
obtaining at each receiving unit an associated carrier signal conveyed via said incoming data modulated optical signal;
determining with each receiving unit a deviation signal based on a difference in frequency and/or phase between the local oscillator signal of the associated modulator and the associated carrier signal conveyed via said incoming UDWDM optical signal; and
conveying the deviation signals to the at least two modulators for adjusting a frequency and/or a phase of the local oscillator signals to reduce the difference in frequency and/or phase.

10. The method according to claim 9, which comprises adjusting the frequency offset for at least one of the modulators by way of a control unit.

11. The method according to claim 9, wherein each of the at least two modulators comprises a frequency shifter that adjusts the local oscillator signal based on the deviation signal obtained from the receiving unit.

12. The method according to claim 9, wherein each of the at least two modulators comprises a phase modulator that adjusts the local oscillator signal based on the deviation signal obtained from the receiving unit.

13. The optical network element of claim 1 further comprising a multi-channel generator for generating a first output signal by modulating a first of the obtained carrier signals with a first data signal and a second output signal by modulating a second of the obtained carrier signals with a second data signal.

14. The optical network element of claim 13, wherein the multi-channel receiver and the multi-channel generator are part of a transceiver.

15. The optical network element of claim 1 wherein the optical network element is an optical line terminal.

* * * * *